UNITED STATES PATENT OFFICE.

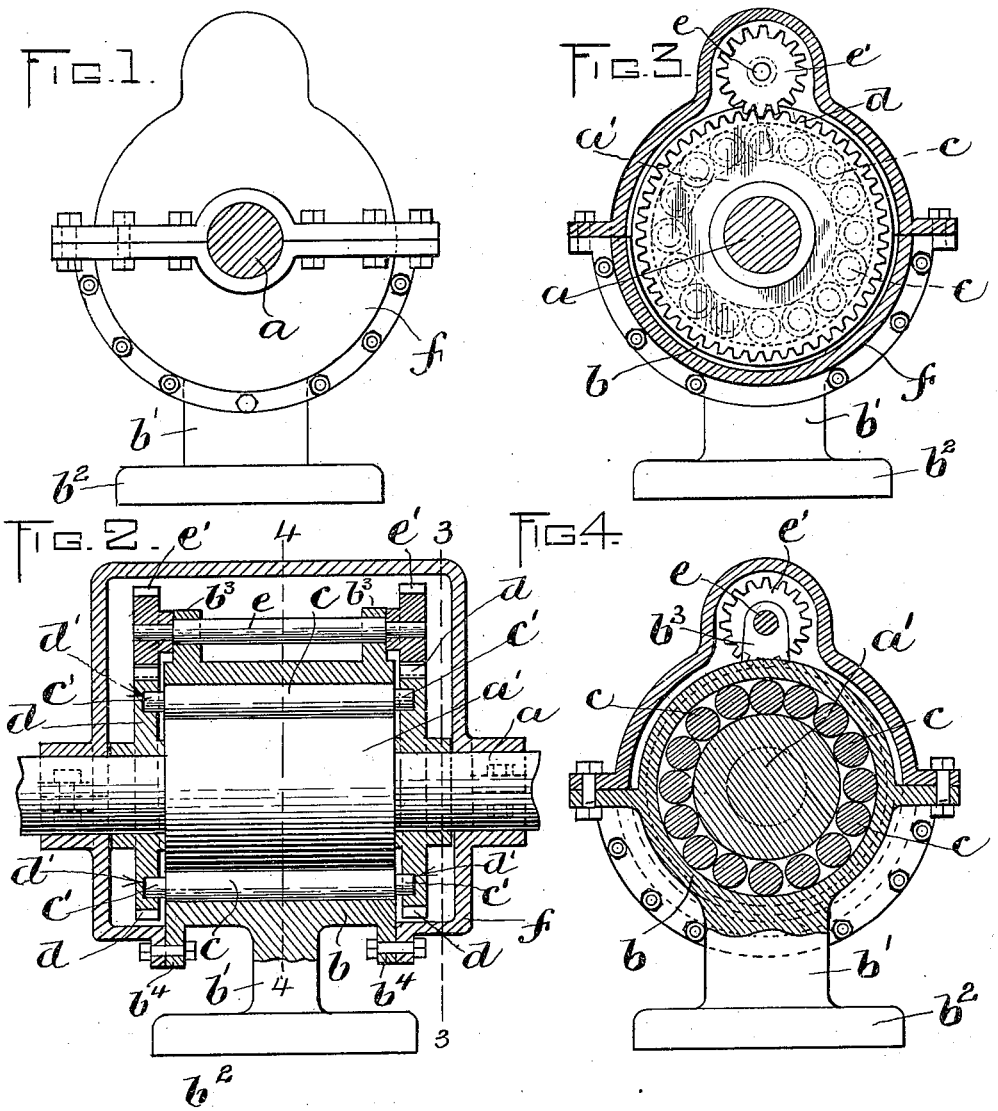

HORACE BROWN, OF READING, MASSACHUSETTS.

ANTIFRICTION-BEARING.

SPECIFICATION forming part of Letters Patent No. 618,558, dated January 31, 1899.

Application filed November 15, 1898. Serial No. 696,523. (No model.)

*To all whom it may concern:*

Be it known that I, HORACE BROWN, residing at Reading, in the county of Middlesex and State of Massachusetts, have invented certain new and useful Improvements in Antifriction-Bearings, of which the following is a specification.

This invention has relation to antifriction-bearings of the class wherein rolls are employed for reducing the friction between two members one of which is rotated relatively to the other.

One of the chief objections to the use of anti-friction-rolls as distinguished from balls is the tendency and liability of the rolls to swing out of parallelism with the axis of rotation of the rotary member, and thereby become wedged. Hence the object of this invention is to provide a bearing of the class mentioned with means for maintaining the rolls in parallelism with each other and with the axis of the rotary member, and thereby gain all the advantages due to the employment of rolls without any of the disadvantages usually resulting therefrom.

To this end the invention consists of a bearing provided with certain features of construction and relative arrangement of parts, all as illustrated upon the drawings and as I shall now proceed to describe in detail, and point out in the claims hereunto appended.

Reference is to be had to the accompanying drawings, and to the letters marked thereon, forming a part of this specification, the same letters designating the same parts or features, as the case may be, wherever they occur.

Of the drawings, Figure 1 represents in end elevation a bearing embodying my invention. Fig. 2 represents a longitudinal sectional view through the same. Fig. 3 represents a sectional view on the line 3 3 of Fig. 2. Fig. 4 represents a transverse section on the line 4 4 of Fig. 2.

Referring to the drawings, $a$ indicates the rotary member, which is provided with a collar or enlargement $a'$ between its ends.

$b$ indicates the stationary member or bearing-block, which is supported upon a standard $b'$, arising from the base $b^2$. This bearing-block is bored out to receive the enlarged portion $a'$ of the rotary member, there being interposed between said members a series of antifriction-rolls $c$, having on their ends trunnions $c'$ $c'$, which project beyond the edges of the bearing-block $b$ and the enlargement or collar $a'$ of the member $a$. The rollers $c$ are arranged in close order, and their trunnions or reduced ends $c'$ are extended into sockets or apertures $d'$ in toothed gears $d$, which are journaled loosely upon the shaft or member $a$, each gear being provided with a series of independent sockets, each of which receives one of the trunnions.

The bearing-block $b$ is provided with upwardly-projecting ears or lugs $b^3$ to receive a small shaft $e$, parallel to the shaft $a$ and having on its ends pinions or gears $e'$ $e'$, intermeshing with the toothed gears or disks $d$. The gears $d$ $d$ are of the same size and have the same number of teeth, the same being true of the gears $e'$ $e'$, and as the last-mentioned gears are keyed or otherwise firmly secured on the shaft $e$ the gears $d$ $d$ are caused to rotate in unison about the axis of the rotary member $a$. The trunnions $c'$ of the rolls $c$ fit loosely in the sockets $d'$ in the gears $d$, and as the said rolls revolve about the axis of the shaft $a$ the gears $d$ $d$ are caused to move in unison, and thereby maintain the rolls $c$ in parallelism with the shaft $a$.

The gears $d$ $d$ constitute spacing devices to hold the rolls at any desired distance apart, and instead of forming them with sockets they may be formed with through-apertures therefor.

The trunnions $c'$ are long enough, as shown in Fig. 2, to prevent the ends of the rolls from frictionally engaging the gears $d$ $d$, and thereby retarding the movement of the rotary member.

The bearing-block is provided with flanges $b^4$ $b^4$ to receive a casing $f$, which may be bolted or otherwise secured thereto, and hence oil or other suitable lubricant may be inserted in the casing, so that the movable parts will travel in a bath of oil.

The gears $d$ $d$, supporting the ends of the rolls, the gears or pinions $e'$ $e'$, meshing with said gears $d$ $d$, and the shaft $e$, journaled in fixed bearings and affixed to the gears $e'$ $e'$, constitute an equalizing mechanism, which is engaged with the ends of the rolls and insures their rotation at a uniform rate, so that they are kept in parallelism. The gears $e'$ $e'$ and shaft *e* constitute equalizing connections between the gears *d d*.

Having thus explained the nature of the invention and described a way of constructing and using the same, though without attempting to set forth all of the forms in which it may be made or all of the modes of its use, I declare that what I claim is—

1. A roller-bearing comprising a rotary member, a stationary member, non-geared rolls interposed between said members, and equalizing mechanism portions of which engage the ends of said rolls for holding them in parallelism with the axis of the said rotary member.

2. A roller-bearing comprising a stationary member, a rotary member, rollers between the said members and having trunnions at their ends, gears having sockets to receive said trunnions, and equalizing connections between said gears whereby they are caused to rotate in unison and hold the rolls in parallelism with the rotary member.

3. A roller-bearing comprising two toothed gears, a series of parallel antifriction-rolls journaled at their ends in said gears and extending between them, and a shaft parallel with said rolls and having gears at its ends meshing with the roll-holding gears, whereby the said gears are caused to rotate in unison and the parallelism of the rolls is preserved.

In testimony whereof I have affixed my signature in presence of two witnesses.

HORACE BROWN.

Witnesses:
A. D. HARRISON,
P. W. PEZZETTI.